United States Patent [19]

Brooks, Jr. et al.

[11] 4,125,432

[45] Nov. 14, 1978

[54] DRIVE MECHANISM NUCLEAR REACTOR CONTROL ROD

[75] Inventors: James G. Brooks, Jr., Southwick, Mass.; Douglas R. Maure, Newington; Christoffel H. Meijer, Windsor, both of Conn.

[73] Assignee: Combustion Engineering, Inc., Windsor, Conn.

[21] Appl. No.: 762,067

[22] Filed: Jan. 24, 1977

[51] Int. Cl.² .................. G21C 7/06; G21C 7/00; G21C 7/08
[52] U.S. Cl. ............................ 176/22; 176/19 EC; 176/36 R
[58] Field of Search .............. 176/19 R, 22, 23, 24, 176/26, 36 R, 36 C; 226/59, 112, 163

[56] References Cited

U.S. PATENT DOCUMENTS

| 3,559,011 | 1/1971 | Edwards | 176/36 R |
| 3,626,493 | 12/1971 | Behmke | 226/54 |
| 3,706,921 | 12/1972 | Rosen | 176/22 |
| 3,765,585 | 10/1973 | Ruoss | 226/163 |
| 3,825,160 | 7/1974 | Lichtenberger | 226/163 |
| 3,992,255 | 11/1976 | DeWesse | 176/36 C |

OTHER PUBLICATIONS

Schultz, "Control of Nuclear Reactors and Power Plants"; 2nd ed. (1961), pp. 232–234.

Primary Examiner—Verlin R. Pendegrass
Assistant Examiner—Donald P. Walsh
Attorney, Agent, or Firm—Joseph H. Born; Edward L. Kochey, Jr.

[57] ABSTRACT

An improved method and apparatus for operating magnetic stepping-type mechanisms. The current flowing in the coils of magnetic stepping-type mechanisms of the kind, for instance, that are used in control-element drive mechanisms is sensed and used to monitor operation of the mechanism. Current waveforms that characterize the motion of the mechanism are used to trigger changes in drive voltage and to verify that the drive mechanism is operating properly. In addition, incipient failures are detected through the observation of differences between the observed waveform and waveforms that characterize proper operation.

24 Claims, 5 Drawing Figures

DRIVE MECHANISM NUCLEAR REACTOR CONTROL ROD

BACKGROUND OF THE INVENTION

The present invention relates to stepping-type magnetic mechanisms and, in particular, to control-rod drive mechanisms of the magnetic-jack variety.

As is well known in the art, nuclear reactors are controlled by inserting and retracting neutron-absorbing control rods into and out of the fuel-bearing core of the reactor. Generally speaking, the rate of reaction is increased by retracting control rods and decreased by inserting them. The most popular method of moving control rods is to use magnetically actuated control-rod drives. The drives move an extension of the control rod by alternately moving one or the other of two latches. In a typical case, each latch would be operated magnetically by two coils. One of the coils would operate to cause the latch to engage the control-rod extension, and the other would operate to raise the latch once it is engaged. The rising latch would raise the control rod with it. Another latch would then engage, the first latch would disengage, and the rod would then be raised by the second latch. Thus, through a sequence of coil actuations, the latches could be made to work in a hand-over-hand manner, thereby retracting or inserting a control rod.

Though the popularity of this method attests to its effectiveness, room for improvement remains. One of the difficulties encountered in the operation of the magnetic jack is that it requires a trade-off between effective operation and longevity. Effective and reliable engagement of the latch can best be afforded when the force caused by the engagement coils is relatively high; whatever tendency there may be for sticking is then more likely to be overcome. On the other hand, longevity is best afforded when the impact of the latches on the control rod is low, and this calls for a lower coil force. Avoidance of sticking is also avoided by relatively high coil force in the lifting step, but the impact between magnetic-jack parts is greater when the lifting-coil force is relatively high, so there is again a trade-off between effective operation and longevity.

It has been suggested that the wear problem could be reduced somewhat by using a two-level drive voltage. The higher voltage would be used at the beginning of the actuation, thereby causing the greatest force when the sticking might occur, and the lower drive voltage would be applied after the higher force had been applied for a fixed time, thereby somewhat reducing the force that impels the latch into contact with the control-rod extension. While this approach is not totally ineffective, there is still usually some overlap between high coil force and latch movement.

SUMMARY OF THE INVENTION

It is accordingly an object of the present invention to provide effective operation of stepping-type magnetic mechanisms while increasing their longevity. It is another object to provide an indication of engagement and raising of individual magnetic-jack latches. It is a further object to anticipate failures by detecting departures of latch operation from normal.

According to the present invention, the current flowing in a coil is sensed, and the response of the current waveform to movement is used as an indication of the occurrence of the mechanical event caused by the coil. This indication is used to determine when to change drive voltage. The deviation of the current waveform from the norm is also used as an indication either of incipient failures due to sticking or of a loss of the stepping-mechanism load.

BRIEF DESCRIPTION OF THE DRAWINGS

These and further features and advantages of the invention become evident in the description of the following embodiment shown in the drawings attached, wherein.

DETAILED DESCRIPTION OF THE PREFERRED EMBODIMENT

Figure 1:
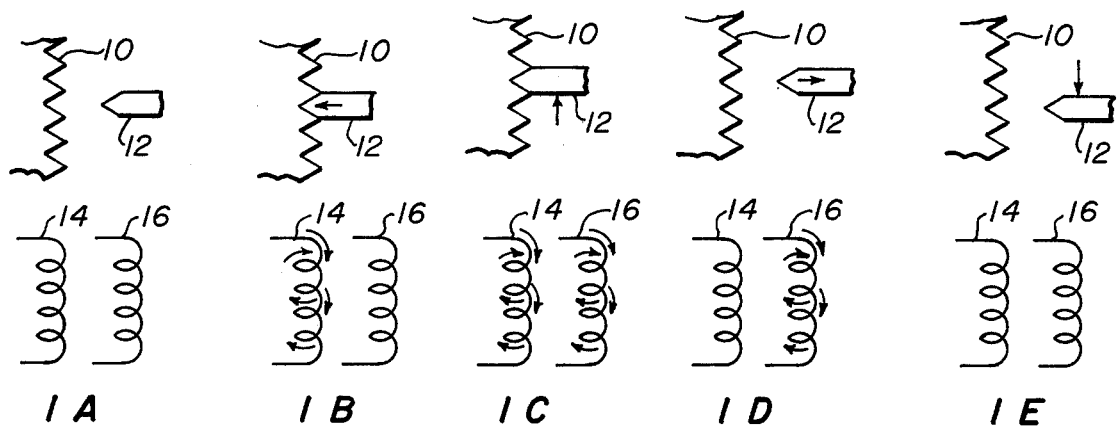
FIG. 1 is a simplified representation of the operation of a typical magnetic-jack actuator.

FIGS. 1A through 1E show in a simplified diagrammatic form the operation of a magnetic-jack control-rod drive with which the present invention may be used. Element 10 represents the edge of a control-rod extension, which has teeth that can be engaged by latch 12. Coils 14 and 16 actuate the latch, the latch being an armature, or operated by armatures, of coils 14 and 16. Coil 14 is energized to bring latch 12 into contact with extension 10, and coil 16 is energized to lift latch 12 into its upper actuated position. In FIG. 1A, latch 12 is in its rest position, which is below and to the right of its fully actuated position, and the control-rod extension is supported by the other latch, which is not shown in the drawing.

In the first step, shown in FIG. 1B, coil 14 is energized, thereby bringing latch 12 into contact with extension 10. After the engagement of latch 12, the other latch, which has not been shown, can be allowed to retract from engagement with extension 10, since extension 10, and therefore the control rod, is now held up by latch 12. In the next step, shown in FIG. 1C, coil 16 is energized, and coil 14 remains energized. This causes latch 12 and extension 10 to be lifted. Between the step shown in FIG. 1C and the step shown in FIG. 1D, the latch that is not shown engages again so that when coil 14 is de-energized, as shown in FIG. 1D, extension 10 remains supported. Once latch 12 is out of engagement with extension 10, as shown in FIG. 1D, then coil 16 can be de-energized, allowing latch 12 to fall to its lower position.

This is a simplified representation of magnetic-jack operation; in the typcial case, the latch that was not shown may also perform a lifting operation instead of merely supporting extension 10 between steps D and A. In such an apparatus, the control rod may be lifted in a hand-over-hand fashion through the use of both latches. A more complete explanation of a typical magnetic-jack actuator can be found in, for example, Behmke, U.S. Pat. No. 3,626,493.

Figure 2:
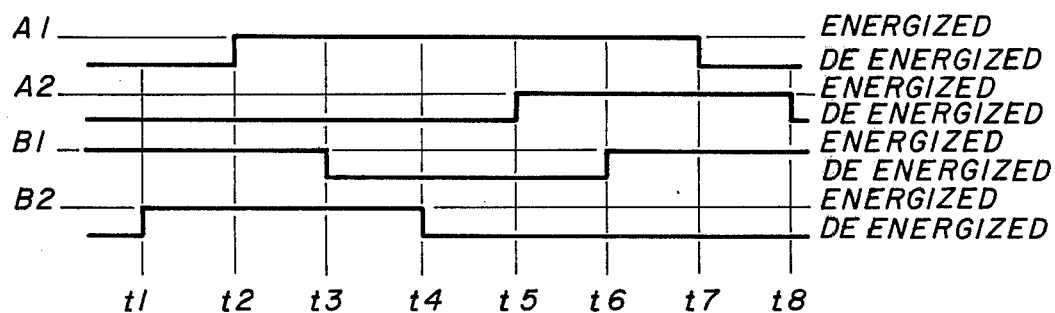
FIG. 2 is a diagram of the timing sequence in which the coils of the magnetic-jack actuator are energized.

Assuming that both latches perform the lifting function, a timing sequence like that shown in FIG. 2 can be employed to energize the coils in such a way that the latches will move the control rods. The timing diagram of FIG. 2 assumes two latches, A and B, with two actuating coils apiece. Coils A1 and B1 are latching coils like coil 14 of FIG. 1, and coils A2 and B2 are lifting coils like coil 16 of FIG. 1. At time $t_1$, the coils associated with latch A are both in repose, so latch A is in the position shown in FIG. 1A. At the same time, both of the coils associated with latch B are energized, so latch B is in the position shown in FIG. 1C. Thus, latch B supports control-rod extension 10. At time $t_2$, coil A1 energizes, bringing latch A into the position shown in FIG. 1B. Both latches now support the control-rod extension, so latch B may be retracted. This retraction is shown in FIG. 2 at $t_3$, where coil B1 becomes de-energized. After $t_3$, therefore, latch A is in the position shown in FIG. 1B, and latch B is in the position shown in FIG. 1D. Since latch B has been disengaged from the control-rod extension, it may now be allowed to fall to its lower position, which is shown in FIG. 2 as the de-energizing of coil B2 at $t_4$. At this point, latch A has taken hold of control-rod extension 10 but has not yet raised it, and latch B has released control-rod extension 10 and assumed its fully deactuated position. Latch A is raised at $t_5$, and control-rod extension 10 is raised with it; this puts the two latches in positions that are exactly the reverse of their positions just after $t_1$. The remainder of the diagram follows the pattern of the first half of the diagram; latch B engages at $t_6$, latch A disengages at $t_7$, and latch A is returned to its lower position at $t_8$. Subsequently, latch B raises control-rod extension 10, returning the system to its $t_1$ state. This sequence is repeated until the control rod has been raised to the desired position. As can be appreciated by those skilled in the art, appropriate timing changes can be used to employ the magnetic jack for lowering of the control rod as well.

The coil current does not assume the wave shape shown in FIG. 2; the leading edges merely show when activating voltages are applied to the coils. The full coil current does not flow immediately, because the inductance of the coil constitutes a kind of inertia in the circuit, causing the current buildup to be gradual. It thus takes a certain amount of time for the current to reach the current level dictated by the resistance of the coil and the applied voltage.

Figure 3:
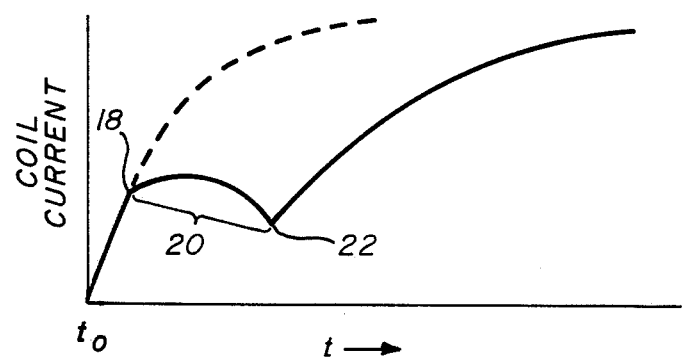
FIG. 3 is a graph of a typical current waveform occurring in a magnetic-jack coil.

The actual current waveform is similar to that shown in FIG. 3. At time $t_0$, the drive voltage is applied, and current begins to build up in the coil. At point 18, however, the magnetic force caused by the current flowing in the coil is sufficient to cause the latch to start moving. As will be recognized by those skilled in the art, this movement causes a "back emf," which opposes the driving voltage and has a tendency to reduce the amount of current flowing in the coil. The actual amount of reduction depends upon the geometry of the system, the mass of the latch, and other physical factors characteristic of the specific system. It is possible that in some cases the slope of the current waveform will never become negative, the way it does in region 20 of FIG. 3. However, the magnitude of the current in any case will be lower while the latch is moving than it would have been if the latch had not moved. Thus, regardless of the physical configuration of the system, the current waveform will have a value during movement that is lower than the value of the dotted line in FIG. 3, which is the shape that the waveform would take if no movement occurred. Thus, it is possible, by looking at the wave shapes, to determine whether movement of the latch has occurred.

It is also possible to determine when movement of the latch has stopped. It is approximately at point 22 in FIG. 3 that the waveform shows that the latch has stopped moving. This point is easy to identify because there is a discontinuity in the slope of the waveform. The discontinuity is caused by the fact that the latch stops suddenly when it engages control-rod extension 10 or reaches the end of its lifting travel. The shape that the waveform assumes after the latch has stopped moving is similar to the shape that it had before it started moving, but the current builds up at a different rate, because the changed latch position has changed the coil inductance.

Figure 4:
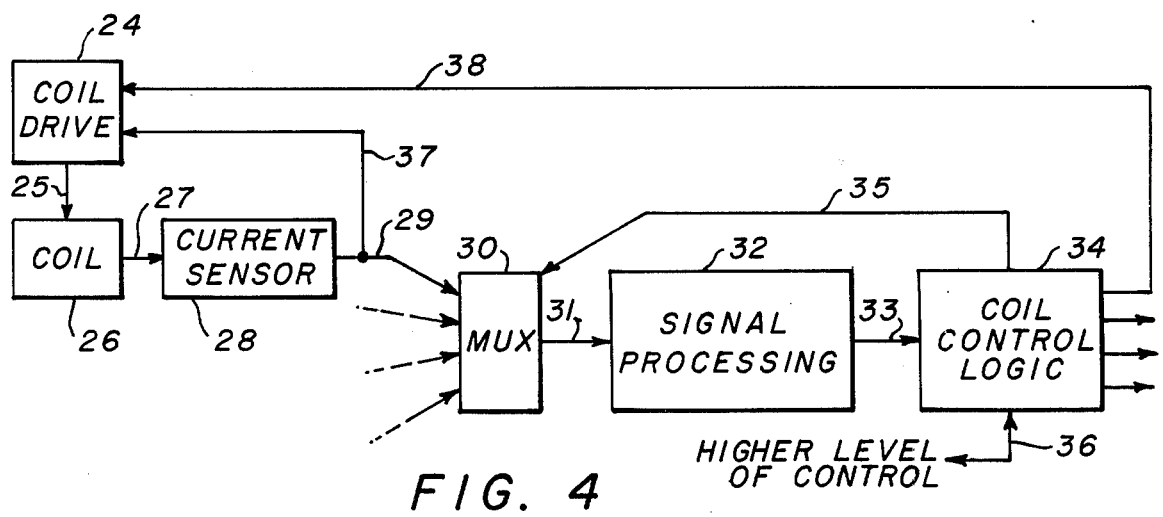
FIG. 4 is a block diagram of the apparatus of the present invention.

The present invention employs these relationships between waveform and latch movement to monitor latch movement, and the information concerning latch movement is used to improve control-rod operation. This function is performed by the apparatus shown in block-diagram form in FIG. 4. Block 24 represents a circuit for driving a coil in response to appropriate signals. In response to these signals, coil drive 24 applies either zero voltage, a high-level drive voltage, a low-level drive voltage, or, by employing feedback, a constant current. Block 26 represents an engagement or lift coil, and it is activated or deactivated by coil drive 24, as indicated by arrow 25. Block 28 represents the function of indicating to coil drive 24 and multiplexer 30 what the magnitude of the current flowing in coil 26 is. This flow of information is indicated by arrows 29 and 37. It is to be noted that the diagram of FIG. 4 is functional, so the current sensing could be done by, say, the same circuit as that which embodies coil drive 24. Additionally, the circuit that provides current feedback to coil drive 24 could be different from the one that provides the current signal to multiplexer 30. However embodied, though, block 28 represents the function of feeding a current-level indication to multiplexer 30 and coil drive 24.

Multiplexer 30 receives signals representing coil current level from each of the coils associated with a single control-rod drive, and signals received from coil control logic 34 as indicated by arrow 35 tell it which of the signals to pass on to signal processing circuitry 32. The flow of information from multiplexer 30 to signal processing circuitry 32 is indicated by arrow 31. Signal processing circuitry 32 is a means for comparing the waveform of the current level to a waveform that is characteristic of the circuit when the armature is at rest and for indicating whether the current waveform is departing from the shape of the at-rest waveform. A simple version of signal processing circuitry 32 includes a differentiator circuit followed by a circuit that generates an output pulse when its input crosses zero. This would be adequate in a system in which armature movement can always be counted on to cause the slope of the curve between points 18 and 22 of FIG. 3 to go negative, because coil control logic 34, which is the element that signals coil drive 24 to begin applying voltage, has sufficient information to determine whether a pulse represents the beginning or the end of latch motion. Of course, there would be a small time delay between the beginning of latch motion and a zero output from the differentiator. A more sophisticated system would employ a microprocessor or minicomputer to store no-motion waveforms. The incoming signal, after being converted to digital form, would be constantly subtracted from a stored waveform, and an appropriate indication would be sent to coil control logic 34 when the deviation of the observed waveform from the stored waveform exceeded a predetermined amount. After motion had been detected, the current signal would be compared to another no-motion waveform, this one being the waveform exhibited by the coil when its armature is in its engaged position. A signal would then be sent to coil logic 34, as indicated by arrow 33, when the current reassumed a no-motion waveform. This computer embodiment would have the advantage that adjustments for temperature changes could easily be made to the reference waveforms, thereby increasing accuracy. Another advantage is that the comparison step could be made in the same hardware as that in which coil control logic 34 is embodied, thus making use of some of the computing power unused by the coil-control function of the element 34 hardware. It will be apparent to those skilled in the art that many other methods of identifying points 18 and 22 of FIG. 3 exist, many of them being digital or analog filtering techniques of numerical methods. In particular, an analog computer could be used as part of block 32 to generate the reference waveforms. All that is necessary is that the embodiment of block 32 detect the deviation of the current waveform from a no-movement waveform.

Figure 5:
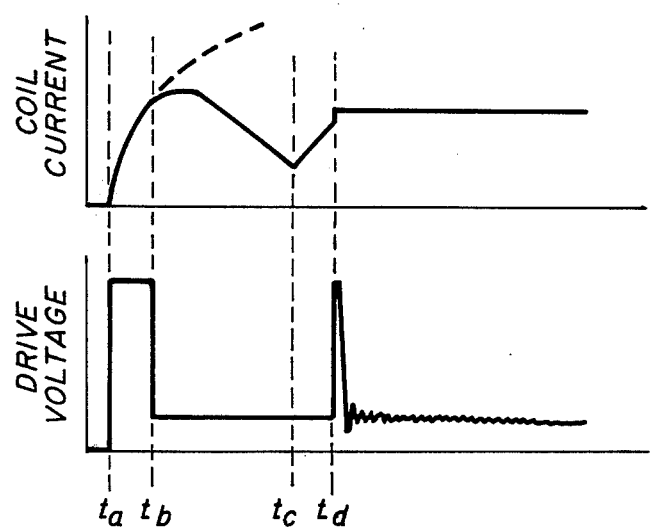
FIG. 5 is a graph showing the relationship of the application of drive voltage to the shape of the current waveform.

Coil control logic 34 performs the control, timing, and decision functions of the system, and the typical embodiment would include a real-time clock and a microprocessor or minicomputer. In operation, coil control logic 34 receives a signal from the next higher level of control that the position of the associated control rod should be higher or lower. Stored programs in coil control logic 34 choose the coil needed to be actuated first for movement of the control rod in the desired direction. Assuming that the appropriate coil is coil 26, coil control logic 34 sends a signal to coil drive 24, as indicated by arrow 38, to indicate that coil drive 24 is to apply a high-level drive voltage to coil 26. The response of coil drive 24 is that shown in the voltage waveform of FIG. 5, in which $t_a$ is the time at which the high-level drive voltage is applied.

At the same time that coil control logic 34 triggers coil drive 24, it signals multiplexer 30, as indicated by arrow 35, to pass the signal received from current sensor 28, which monitors coil 26. When the drive voltage from coil drive 24 is applied to coil 26, current begins to flow, and a signal representative of the current level is sent through multiplexer 30 to signal processing circuitry 32. At $t_b$ the current waveform of FIG. 5 departs from that which it would maintain if the armature were at rest. Signal processing circuitry 32 detects this departure and signals coil control logic 34, as indicated by arrow 33, that the armature has moved. Coil control logic 34 then signals coil drive 24 to reduce the drive voltage, and this reduction is illustrated in the voltage waveform of FIG. 5 at $t_b$.

At $t_c$, the current waveform reassumes a shape that is characteristic of a stationary armature, though this wave shape has a slower rate of increase than the previous no-movement waveform. This resumption of a no-motion waveform is detected by signal processing circuitry 32, and a signal is sent to coil control logic 34 informing it of the engagement of the latch if coil 26 is an engagement coil or of the end of the lifting travel if coil 26 is a lift coil. Coil control logic 34 responds to this signal by, for instance, causing coil drive 24 to switch to a current mode in order to more closely control latching force. This is represented by an unsteady voltage waveform and a steady current waveform starting at $t_d$.

The delay between $t_c$ and $t_d$ is shown merely for purposes of illustration of the current waveform, since the reaction time of the computer would typically be very short in comparison to the current waveform. However, it may be found that a timed delay in conversion to current mode might be desirable in order to allow the current to reach the desired level before feedback is applied.

As can be appreciated from the above discussion, two of the objects of the invention, the reduction of wear and the detection of the raising and engagement of individual latches, are accomplished by the system of the present invention. Another object, detection of incipient failure, can also be accomplished by the detection of armature motion. By use of its real-time clock, coil-control logic 34 can measure the time between the application of drive voltage and the receipt of the indication that the armature is moving. Should this time be abnormally high, coil control logic 34 would indicate to an operator or appropriate control hardware (the "higher level of control" in FIG. 4) that the latch is beginning to stick. (In the case of a lifting coil, an abnormally high time could also mean that the latch had not disengaged.) This allows appropriate corrective action to be taken at the next scheduled maintenance period, thus avoiding a costly unscheduled shutdown. The flow of signals and information between coil control logic 34 and the next higher level of control is indicated by double arrow 36. A further function that is performed by the present system is the detection of dropped control rods. If a control rod becomes disconnected from its control-rod extension, the control-rod extension becomes easier to lift, so the time between points 18 and 22 of FIG. 3 is shorter for lifting coils. Coil control logic 34 measures the time between points 18 and 22, and, if the coil is a lifting coil, it notifies the appropriate operator or equipment that its rod had dropped. Timing this interval could also be useful in monitoring engagement-coil operation, since too short a time between points 18 and 22 would indicate that the latch had come to rest on a tooth, rather than a space, on the control-rod extension. Appropriate action, such as de-energizing and re-energizing the coil, could than be taken.

In addition to its role in affecting the operation of the coil in which it is flowing, the current through a coil is used, according to the present invention, to determine when to actuate other coils. If coil control logic 34, for instance, has not received an indication from signal processing circuitry 32 that the latch has moved, it does not order further coil actuation of other coils within its control. This is done in order to ensure that the control rod is supported at all times. It would also typically inform the higher level of control that the latch was struck so that a halt could be called to further driving of some other control rods, because it is usually desired to have certain control rods move in unison through the core in order to avoid a problem known in the art as "flux peaking." By sensing the movement of the latches, therefore, it is possible to reduce the probability of dropping control rods and to ensure synchronous movement where it is desired.

While the invention has been described in conjunction with a specific emdodiment, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A method of monitoring the movement of a control-rod-drive latch that is operated by a drive coil, comprising the steps of:
   a. sensing the current level in the drive coil; and
   b. comparing the waveform in the current level to at least one waveform that is characteristic of the coil when the latch is not moving, thereby detecting the start of the latch movement when the current waveform deviates from a waveform that is characteristic of the coil when the latch is not moving and detecting the end of latch motion when the current reassumes a waveform that is characterstic of the coil when the latch is not moving.

2. A method as recited in claim 1, wherein the current is caused to flow by means of a drive voltage, further comprising the step of reducing the drive voltage when the start of latch movement has been detected.

3. A method as recited in claim 2 further comprising the step of increasing the drive voltage when the completion of the latch motion has been detected.

4. A method as recited in claim 1, wherein the current is caused to flow by means of the drive voltage, further comprising the step of increasing th drive voltage when the completion of the latch motion has been detected.

5. A method as recited in claim 1, wherein the latch is one of a plurality of other latches, further comprising the step of preventing another latch in the plurality of latches from moving until completion of the latch motion has been detected.

6. A method as recited in claim 1, further comprising the step of measuring the length of time between the deviation from a no-motion waveform and the assumption of a no-motion waveform and generating an appropriate indication when the length of time is outside a predetermined normal range.

7. A method as recited in claim 6, wherein the appropriate indication is an indication of the loss of a control rod.

8. A method as recited in claim 1, wherein the current is caused to flow by the application of a drive voltage, further comprising the step of measuring the length of time between the application of the drive voltage and the start of the latch motion and generating an appropriate indication when the length of time is outside a predetermined normal range.

9. A method as recited in claim 8, wherein the appropriate indication is an indication of an incipient failure in the latch.

10. In an apparatus comprising a means for applying a voltage, a circuit connected to the voltage means for allowing a current to flow when the voltage is applied by the voltage means, the application of voltage thereby causing a magnetic field, and an armature arranged to move in response to the magnetic field, the improvement comprising:
   a. means for sensing the current flowing in the circuit and generating an output indicative of the amount of current flow; and
   b. means, connected to receive the output of the sensing means, for comparing the waveform of the current level in the circuit to a waveform that is characteristic of the circuit when the armature is at rest and for indicating whether the current waveform is departing from the shape of a waveform characteristic of the circuit when the armature is at rest, the indication thereby permitting armature motion to be monitored.

11. An apparatus as recited in claim 10 further comprising a means, connected to receive the indication of departure from an at-rest waveform, for reducing the voltage applied by the voltage means when the current waveform departs from an at-rest waveform.

12. An apparatus as recited in claim 11 wherein the means for sensing the current flowing in the circuit is a means for sensing the current flowing in a drive coil of a control-rod latch mechanism, the armature being a movable part of the latch mechanism and the departure indication thereby being an indication of latch motion.

13. An apparatus as recited in claim 10 further comprising a means, connected to receive the departure indication, for increasing the voltage applied by the voltage means when the current waveform reassumes the shape of an at-rest waveform.

14. An apparatus as recited in claim 13 further comprising means, connected to receive the departure indication, for reducing the voltage applied by the voltage means when the departure means indicates a departure from an at-rest waveform.

15. An apparatus as recited in claim 13 wherein the means for sensing the current flowing in the circuit is a means for sensing the current flowing in a drive coil for a control-rod latch mechanism, the armature being a movable part of the latch mechanism and the departure indication thereby being an indication of the latch motion.

16. An apparatus as recited in claim 10 wherein the armature is one of a plurality of devices to be operated in sequence, further comprising means, connected to receive the departure indication for preventing operation of another of the plurality of devices until the departure-indicating means indicates that the armature has stopped.

17. An apparatus as recited in claim 16 wherein the means for sensing the current flowing in the circuit is a means for sensing the current flowing in a drive coil for a control-rod latch mechanism, the armature being a movable part of the latch mechanism and the departure indication thereby being an indication of latch motion.

18. An apparatus as recited in claim 17 wherein the devices are parts of control-rod latch mechanisms.

19. An apparatus as recited in claim 10, further comprising a means, receiving the departure indication, for measuring the length of time between the start of motion and the end of motion and generating an indication of whether the length of time is within predetermined limits, an indication that the length of time is outside the predetermined limits being an indication of abnormal operation.

20. An apparatus as recited in claim 19 wherein the means for sensing the current flowing in the circuit is a means for sensing the current flowing in a drive coil for a control-rod latch mechanism, the armature being a movable part of the latch mechanism, and the departure indication thereby being an indication of latch motion.

21. An apparatus as recited in claim 20 wherein the length-of-time indicating means is a means for indicating that a control rod has been lost when the length of time is below the predetermined lower limit.

22. An apparatus as recited in claim 10 further comprising a means, receiving the departure indication, for detecting the application of voltage to the circuit and measuring the length of time between the application of voltage and the motion of the armature and generating an appropriate indication when the length of time is greater than a predetermined limit.

23. An apparatus as recited in claim 22 wherein the means for sensing the current flowing in the circuit is a means for sensing the current flowing in a drive coil for a control-rod latch mechanism, the armature being a movable part of the latch mechanism and the departure indication thereby being an indication of the latch motion.

24. An apparatus as recited in claim 22 wherein the appropriate indication is an indication of an incipient failure in a control-rod latch mechanism.

* * * * *